United States Patent [19]

Verschage

[11] 3,894,645
[45] July 15, 1975

[54] FOLDING GOOSENECK TRAILER

[75] Inventor: Richard Verschage, Cedar Rapids, Iowa

[73] Assignee: Transport Trailers, Inc., Cedar Rapids, Iowa

[22] Filed: July 26, 1974

[21] Appl. No.: 492,241

[52] U.S. Cl............................ 214/506; 280/425 A
[51] Int. Cl.............................................. B60p 1/04
[58] Field of Search..... 280/425 A, 423 B; 214/506, 214/505

[56] References Cited
UNITED STATES PATENTS

| | | | |
|---|---|---|---|
| 2,590,210 | 3/1952 | Rogers | 280/425 A X |
| 2,774,497 | 12/1956 | Martin | 280/423 B X |
| 3,419,169 | 12/1968 | James | 280/425 A X |
| 3,756,443 | 9/1973 | Verschage et al. | 214/506 |

FOREIGN PATENTS OR APPLICATIONS 401,426  3/1968  Australia........................ 280/423 B Primary Examiner—Leo Friaglia
Attorney, Agent, or Firm—McDougall, Hersh & Scott

[57] ABSTRACT

An industrial trailer having a collapsible gooseneck is disclosed. A load bed is raised and lowered by a pair of hydraulic bed cylinders while the gooseneck is operated by a second pair of hydraulic cylinders. Both sets of cylinders are interconnected such that the gooseneck cylinders function as a bracing element during the raising and lowering of the load bed.

14 Claims, 12 Drawing Figures

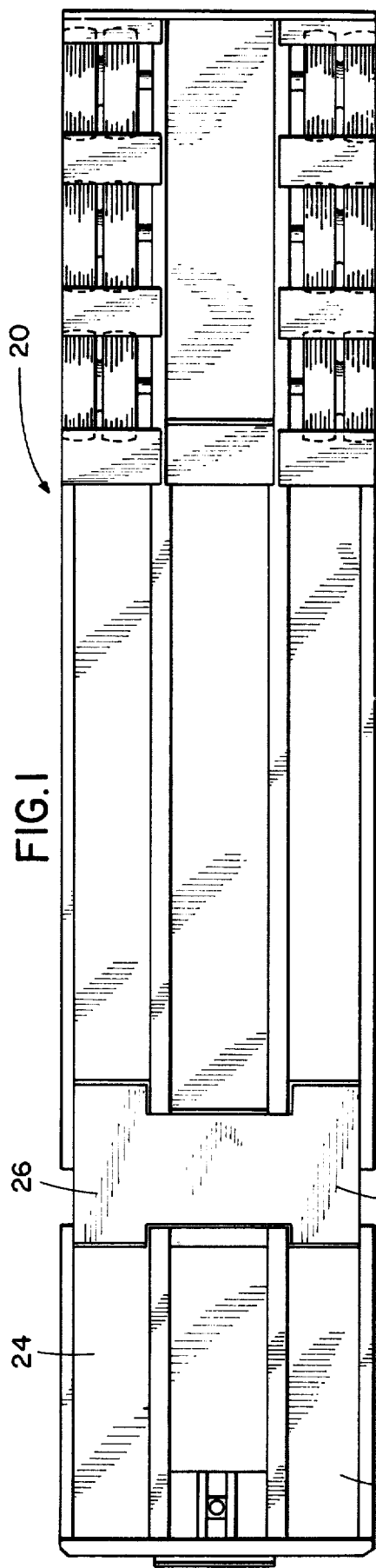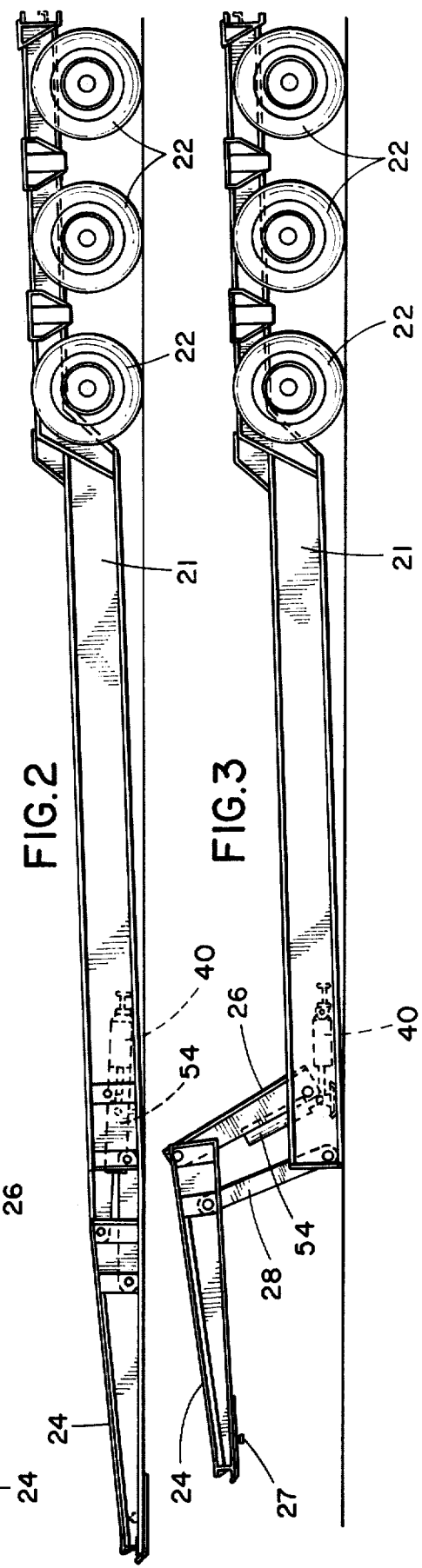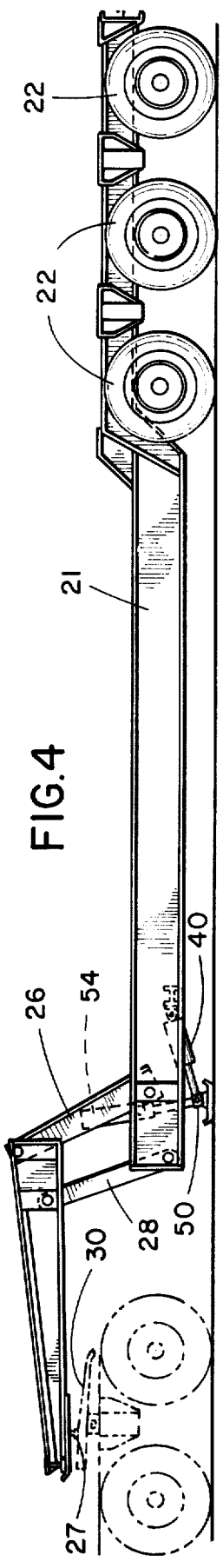

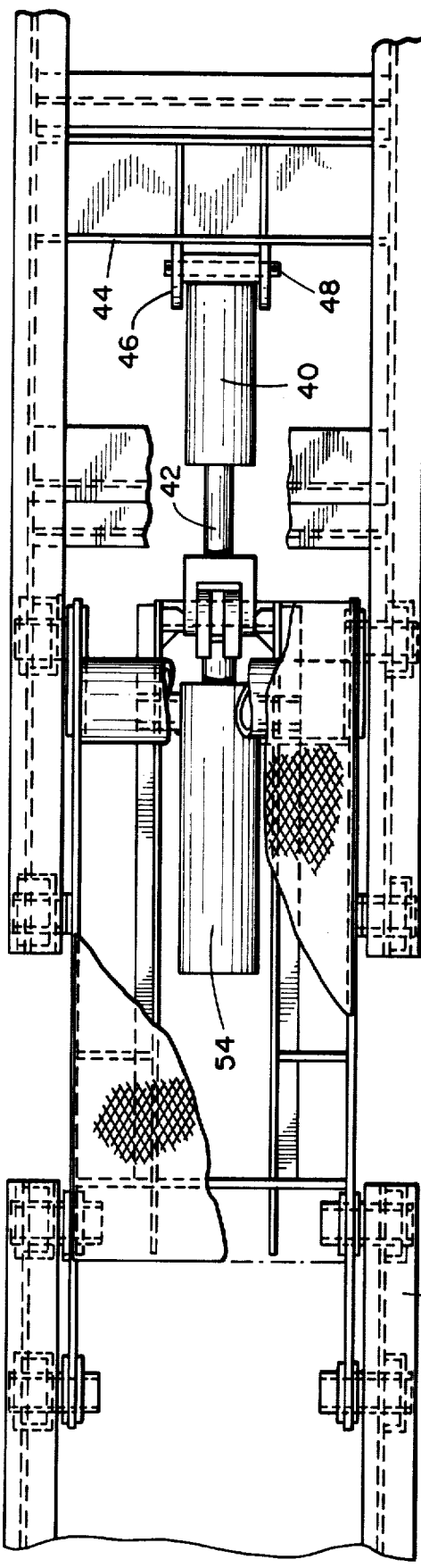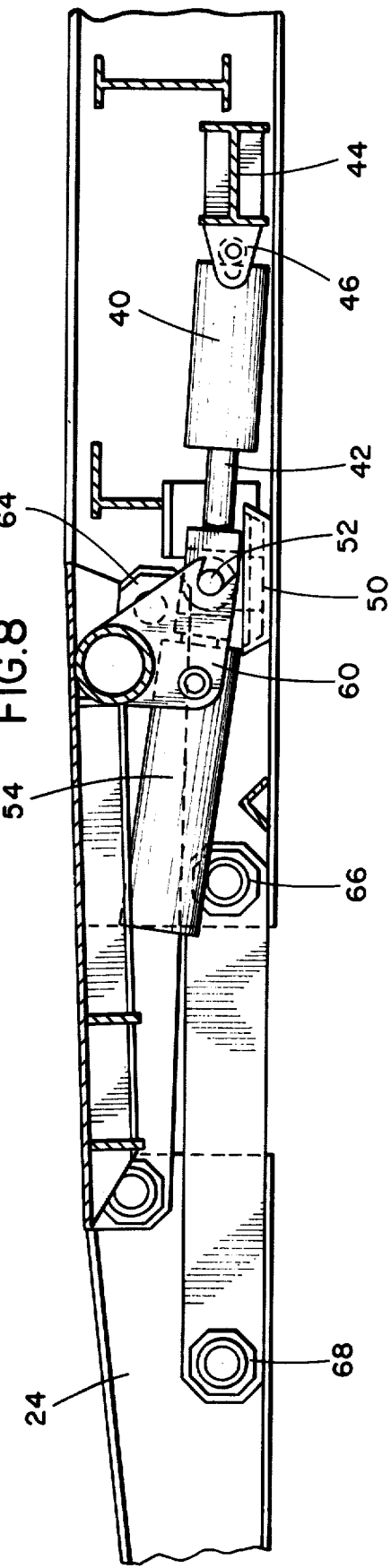

FOLDING GOOSENECK TRAILER

BACKGROUND OF THE INVENTION

The present invention relates to heavy duty industrial trailers and more particularly to those which have collapsible goosenecks to facilitate loading and unloading of cargo thereon. Folding gooseneck trailers of the present type have a loading bed connected to a trailer bed by a set of links. The loading bed is adapted to connect to a towing vehicle as well as to act as an on and off loading ramp when the trailer is not being towed. The present invention is concerned with a particular arrangement for raising and lowering the loading bed relative to the trailer bed and for raising and lowering the trailer bed itself. Examples of prior devices include U.S. Pat. Nos. 2,590,210 to Rogers and 3,419,169 to James. With particular reference to the James patent, it is noted that this reference discloses a hydraulically operated gooseneck which is raised or lowered in a single stage; that is, the loading bed is raised at the same time that the gooseneck is formed. This design is not entirely satisfactory in that after the trailer has been loaded, this simultaneous operation causes higher rotational loads on the compression bottom pivot mounts and the top linkage.

It is accordingly an object of the present invention to provide a hydraulically operated folding gooseneck for a trailer in which forming of the gooseneck is independent of the vertical trailer bed movement.

It is another object of the present invention to provide a folding gooseneck wherein the means for folding the gooseneck functions as a brace for the trailer bed when it is raised and lowered.

It is another object of the present invention to provide a folding gooseneck which operates in two stages to avoid higher rotational loads on the loading bed and the pivot assembly.

Other objects and advantages of the invention will be apparent from the concluding portion of the specification.

SUMMARY OF THE INVENTION

The present invention is directed to a folding gooseneck for an industrial trailer. The gooseneck is hydraulically operated and includes means for folding the gooseneck and for raising and lowering the trailer bed. While the two means are independent in that they are separately actuated by independent controls, they are interconnected to a common element whereby the hydraulic means for folding the gooseneck operates as a brace to correctly position the hydraulic means for raising and lowering the trailer bed. Appropriate safety interlocks are provided to prevent the brace means from being operated accidentally when it is utilized as a bracing member.

BRIEF DESCRIPTION OF THE DRAWINGS

FIG. 1 is a top view of an industrial trailer including a hydraulically folding gooseneck of the present invention;

FIG. 2 is a side elevation of the trailer of FIG. 1 in its loading position wherein the loading bed is resting on the ground to permit easy loading of equipment onto the trailer bed;

FIG. 3 is a side elevational view illustrating the gooseneck in its folded position in preparation for loading the trailer onto a truck cab;

FIG. 4 is a side elevational view of the trailer wherein the trailer bed has been raised off the ground and a truck cab has been backed under the fifth wheel device in preparation for coupling the trailer thereto;

FIG. 7 is a top view of one of the frame members illustrating the interconnected cylinder arrangement;

FIG. 8 is an enlarged sectional view of the frame member of FIG. 7;

DETAILED DESCRIPTION

Figure 5:
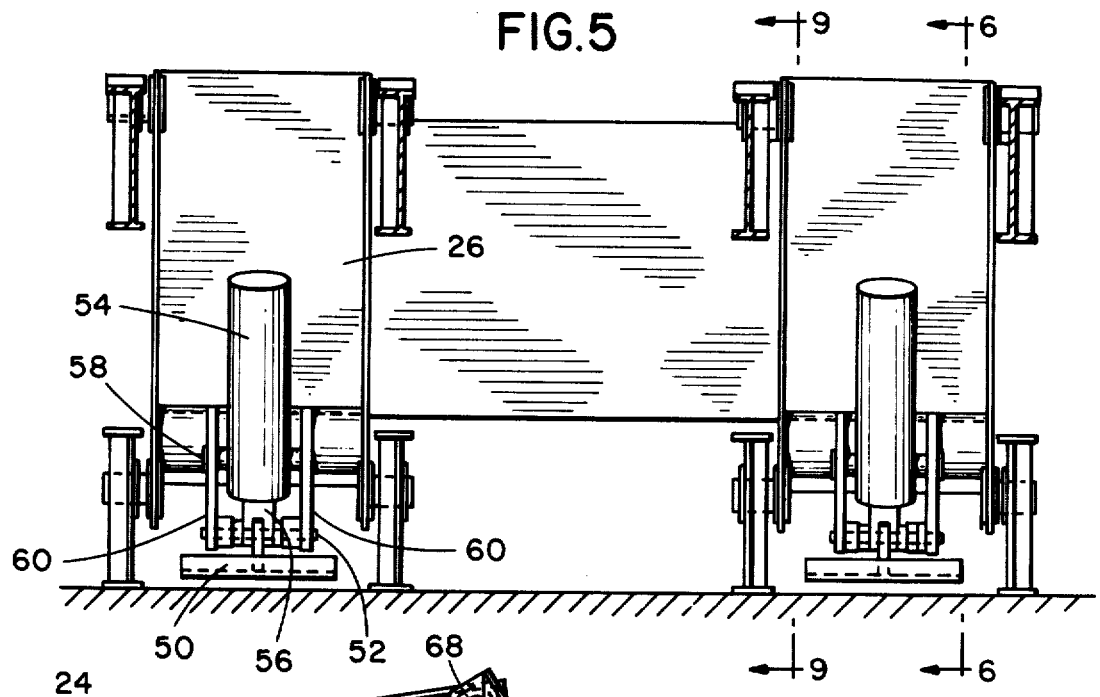
FIG. 5 is a front view of the gooseneck in its folded position illustrating the trunnion mounting of the bed cylinders.

Referring to FIGS. 1–4, the industrial trailer according to the present invention is illustrated. The trailer includes a bed 20 formed by frame members 21 which may have wood decking thereon and is adapted for receiving the load to be carried by the trailer. At the rear end of the bed 20 are a plurality of wheel and axle assemblies 22. Attached to the forward end of the bed is the folding gooseneck mechanism. The folding gooseneck includes a loading bed 24 having a downwardly inclined configuration to facilitate loading of equipment and machinery onto the trailer bed and a folding linkage assembly. The linkage includes a pair of top or compression links 26 and a pair of bottom or tension links 28. The link pairs 26 and 28 connect the load bed 24 to the trailer bed 20 in a manner so as to permit folding or pivoting the loading bed 24 from the position shown in FIG. 2 to the position shown in FIG. 3.

As indicated in FIGS. 3 and 4, the underside of the loading bed 24 is provided with a pintle 27 for engaging a fifth wheel device 30 of a truck cab. The truck cab forms no part of the present invention and is indicated in dashed lines in FIG. 4. Before detailing the operating mechanism for the folding gooseneck, it will be instructive to briefly review the operating sequence of the device. The trailer is loaded with its cargo and in the ground position shown in FIG. 2. To connect the trailer to a truck cab for hauling, the folding gooseneck is raised to the position shown in FIG. 3. Next the trailer bed is lifted off the ground in a manner to be described so that it is positioned as shown in FIG. 4 and the truck cab is backed under the load bed until it is directly under the pintle 27. The trailer is then lowered onto the fifth wheel device 30 thereby engaging the pintle and supporting the trailer on the cab.

Referring now to FIGS. 5–8, the hydraulic mechanism for operating the gooseneck and for raising and lowering the trailer bed is disclosed in greater detail. A brace cylinder 40 having a corresponding piston 42 associated therewith is mounted to both of the longitudinal frame members 21 which form the bed 20. As shown best in FIGS. 7 and 8, the brace cylinder 40 is mounted to a cross-member 44 by means of a slotted U-shaped member 46. The cylinder is pinned in the slot by means of a retaining rod 48. The cylinder is therefore free to pivot in the slot and to move a small distance forward or rearwardly on the frame member. The two brace cylinders 40 are single acting cylinders whereby hydraulic pressure is effective for causing the piston 42 to extend outwardly therefrom. As will be described, this causes the gooseneck to assume the raised position. The piston 42 is retracted by the weight of the gooseneck as it is being lowered, and accordingly, double acting cylinders are unnecessary for this purpose.

The end of the piston 42 is secured to a ground pad 50 by means of a rod 52. Both ground pads 50 are adapted to raise the trailer bed 20 off the ground when extended downwardly.

Mounted to each of the compression links 26 is a bed cylinder 54 having a corresponding piston 56. Each bed cylinder is mounted to the compression link by a trunnion mount 58 near the piston end of the cylinder. The bed cylinders 54 are thus rotatably mounted to the compression link such that the end remote from the piston remains free. The bed cylinder piston 56 is attached to the ground pads 50 by a rod 52. Thus, as indicated most clearly in FIG. 6, the piston ends of both the bed cylinders and the brace cylinders are attached by rod 52 to the ground pads 50.

Triangular shaped hook plates 60 are attached to the compression links 26 on either side of the bed cylinders 54. These hook plates have a cutout portion 62 adapted to engage the rod 52 on either side of the ground pad 50. The hook plates cause the gooseneck assembly to lift when the piston 42 of the brace cylinder 40 is extended. The hook plates act as lever arms during the operation of the brace cylinder to cause the compression link to rotate clockwise about a pivot mount 64. A similar pivot 66 is provided for the tension link 28. Both the compression and tension links have corresponding pivot mounts 68 on the loading bed 24.

Figure 6:
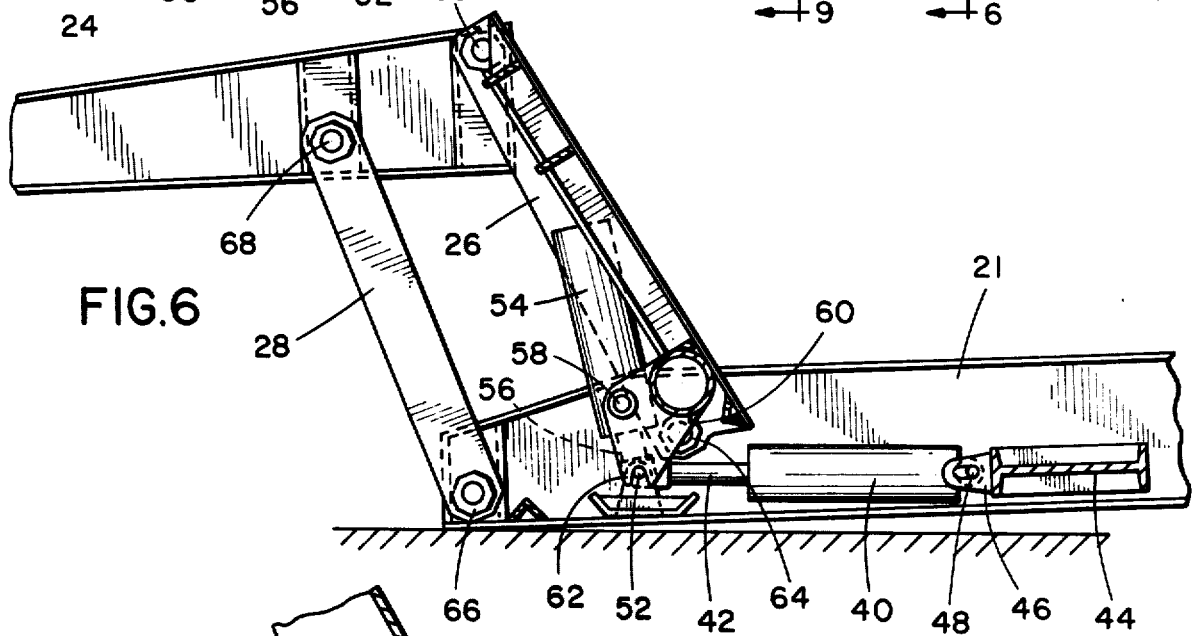
FIG. 6 is a side view on an enlarged scale of the details of the folded gooseneck device.

As indicated in FIG. 2, when the gooseneck is down, the bed cylinders 54 are substantially parallel to the ground as are the brace cylinders 40. On the other hand, when the gooseneck is in the up position as illustrated in FIGS. 3 and 6, the bed cylinder 54 is positioned substantially perpendicular to the ground while the brace cylinder 40 remains parallel thereto. Recalling that the bed cylinders 54 are trunnion mounted to the compression link 26, it will be appreciated that in order to use these cylinders for lifting the loaded trailer bed it is necessary to brace or secure the assembly so that there is no danger of the trailer shifting and collapsing off of the ground pads 50. This bracing is achieved by means of the brace cylinders 40 due to the interlocking arrangement of the ends of the pistons.

Figure 10:
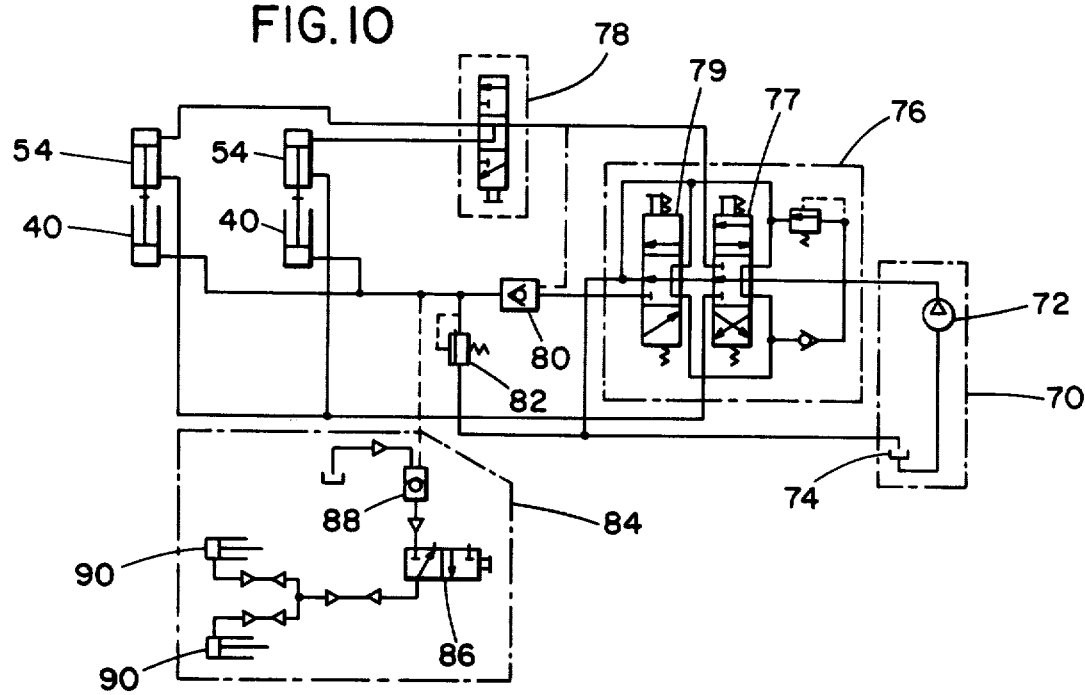
FIG. 10 is a schematic diagram of the hydraulic circuit utilized in the present invention, including the air interlock system.
Figure 11:
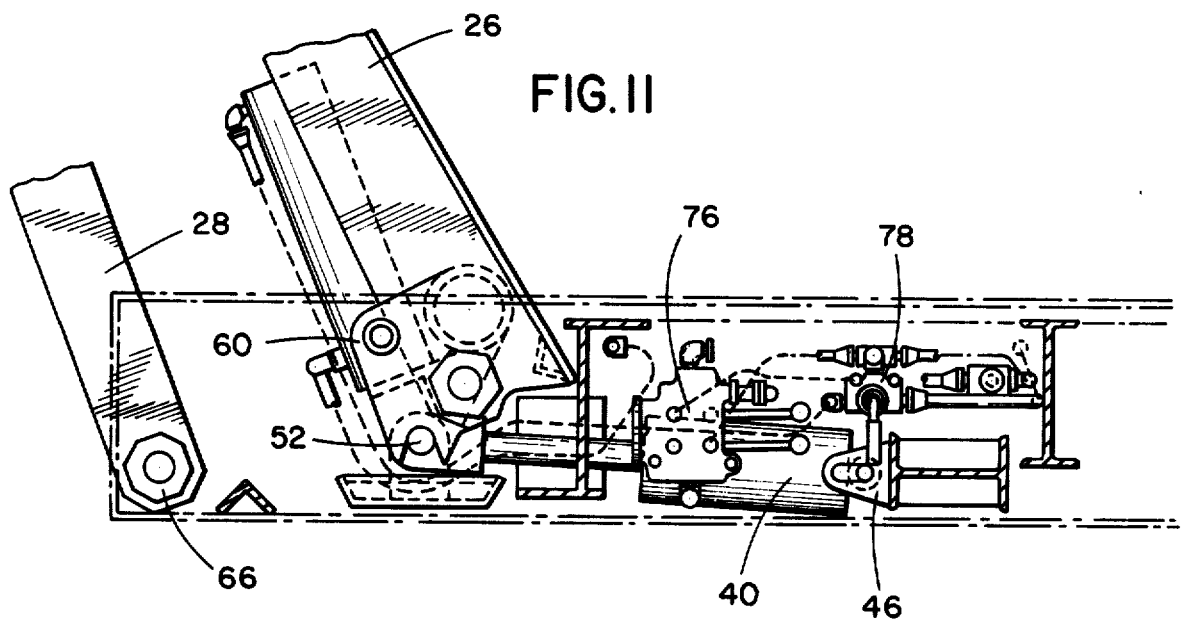
FIG. 11 is a sectional view illustrating the hydraulic control system.

Referring to FIG. 10, a schematic of the hydraulic system for operating the gooseneck and for raising and lowering the trailer is shown. The hydraulic system includes a hydraulic unit 70 including a pump 72 and a sump 74. The pump supplies hydraulic fluid to the brace cylinders 40 and the bed cylinders 54 via control valves 76 and 78. The control valves 76 include a four-way spool valve 77 and a three-way spool 79. The four-way spool 77 operates the double acting bed cylinders while the three-way spool 79 operates the single acting brace cylinders. Valves 78 are leveling valves for permitting independent adjustment of the bed cylinders when the trailer is being loaded on sloped terrain.

Included in the hydraulic system is a pilot angle check valve 80 and an overpressure relief valve 82. The angle check valve 80 is activated when the bed cylinders cause the pads 50 to engage the ground, thereby creating pressure on the check valve. This pressure closes off the hydraulic system to the brace cylinders preventing operation by the control valve 79. This safety feature prevents movement of the brace cylinders when they are being used as braces for lifting the trailer. Subsequently, when the ground pads 50 are retracted, pressure is removed from the angle check valve 80, thereby again permitting operation of the brace cylinders 40.

Figure 9:
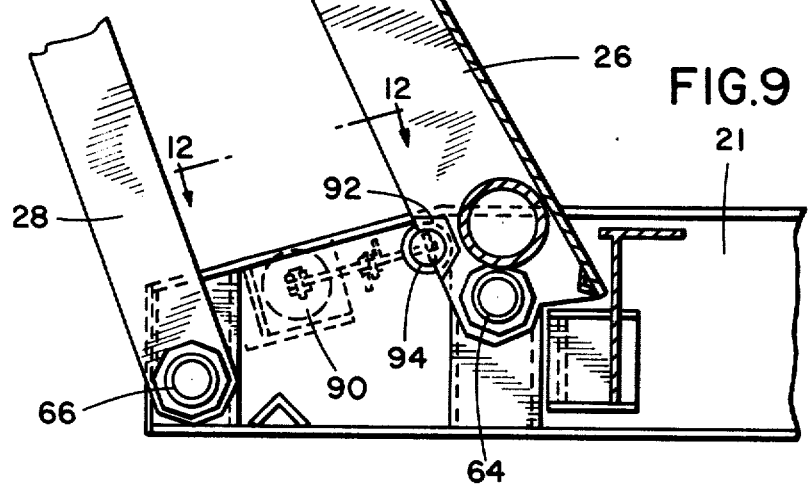
FIG. 9 is a partial side view illustrating in greater detail the safety locking features of the present invention.
Figure 12:
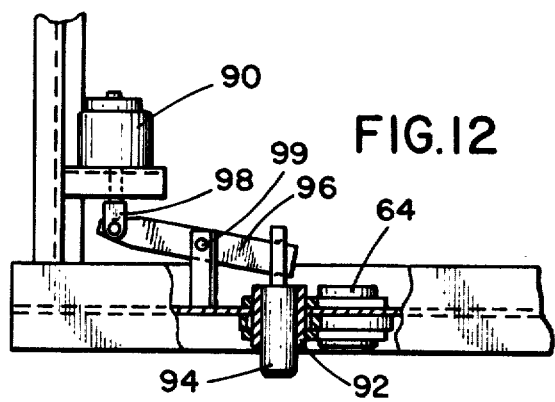
FIG. 12 is a view of the safety interlock system taken along the lines 12—12 of FIG. 9.

Interconnected to the hydraulic system is an air interlock system indicated by numeral 84 in FIG. 10. The air interlock system includes an air control valve 86, a pilot operated check valve 88 and preferably a pair of air operated cylinders 90. The structure of the air interlock system is illustrated in FIGS. 9 and 12 and will be described subsequently. The purpose of the air interlock 84 is to prevent the gooseneck from coming down while the trailer bed 20 is being lowered from the pads 50 to the ground. If the gooseneck were lowered while the trailer is being lowered to the ground, the hook plates 60 would rotate out of position so that they would not engage the shaft 52 as necessary for proper operation. Accordingly, the air interlock system cooperates with a blocking pin 94 to prevent the gooseneck from being lowered. In order to lower it it is necessary to move the blocking pin by operating the control valve 86. However, if the hydraulic fluid is cut off from the brace cylinders 40 indicating the trailer is off the ground, check valve 88 prevents operation of the air interlock.

When hydraulic pressure is restored to the brace cylinders 40, indicating that the pads have been fully retracted, the air control valve 86 is operated to remove the blocking pin 94 of FIG. 9 as will be described.

Referring now to FIGS. 9 and 12, the air interlock system for maintaining the gooseneck is illustrated. When the loading bed is in its elevated position, a notched portion 92 provided on the underside of the compression links 26 is adapted to receive the blocking pin 94. When the pin is received in the notched portion 92, the gooseneck cannot be moved to its lowered position. As shown in FIG. 12, the blocking pin 94 is connected by a rod 96 to the piston 98 of the air cylinder 90. Operation of the air cylinder 90 causes an extension of piston 98, thereby rocking the arm 96 about the fulcrum 99 for withdrawing the pin from the notched portion 92.

As stated in connection with the description of FIG. 10, the air cylinder 90 is controlled by the air control valve 86 but is rendered inoperative unless and until the bed cylinders 54 have been fully retracted to lift the pads off the ground. Prior to withdrawing the blocking pin the gooseneck is raised slightly to remove its weight from the pin. The pin is then retracted and the gooseneck lowers itself.

OPERATION

In order to lower the trailer and the gooseneck to the ground when it is desired to unload the trailer, the following operating sequence is required. The control valve 77 is operated so as to cause the bed cylinders 54 to extend downwardly, thereby causing the ground pads 50 to lift the trailer off of the fifth wheel supporting device of the truck cab. When the trailer has been lifted by an amount sufficient to clear the cab, the cab is driven away. The control valve 77 is then operated in the opposite direction until the bed cylinders are fully retracted, lowering the trailer to the ground while the gooseneck remains in its upright position. It should be noted that due to the pilot angle valve 80, as soon as the pads touch the ground and begin lifting the trailer, the brace cylinders 40 are disabled and thereby effectively locked in their extended position to serve as a brace for the bed cylinders to insure that the assembly cannot collapse. When the trailer has been fully lowered to the ground and the pads thereby fully retracted, pressure is removed from the angle check valve 80, thereby again permitting operation of the brace cylinders 40 and the air interlock 84.

To lower the gooseneck, it is first necessary to clear the blocking pin 94. The control valve 79 is operated to raise the gooseneck just slightly to relieve the pressure of the gooseneck on the blocking pin. The air control valve 86 is then operated to actuate cylinder 90 and pivot the blocking pin 94 away from the cutout portion 92. When the blocking pin is thus retracted, control valve 79 is operated to permit the fluid in the brace cylinders 40 to be forced back to the sump reservoir 74 by the weight of the loading bed as it lowers itself to the ground. The equipment transported on the trailer bed can now be off-loaded down the inclined loading bed 24.

In order to restore the trailer to its former position for transporting a further load, the above described steps are merely reversed. The gooseneck is raised by operation of the control valve 79 causing the brace cylinders 40 to extend their pistons forwardly and rotate the loading bed 24 on the compression and tension links to the raised position. This is accomplished due to the rotation caused by the pistons 42 engaging the hook plates 60 attached to the compression links. When the piston 42 is fully extended, the gooseneck will be in the position illustrated in FIGS. 3 and 6. Next, the air control valve 86 is actuated to restore the blocking pin to prevent the gooseneck from coming down should the control valve 79 be inadvertently operated.

To raise the trailer off the ground, the bed cylinders 54 are next operated. As the bed cylinders are operated, they cause the ground pads to extend lifting the trailer unit off the ground. As soon as there is pressure on the ground pads, the angle check valve 80 disables the brace cylinders, thereby locking the brace cylinders in the extended position. Since the brace cylinders and the bed cylinders are connected to the ground pad, the braced lifting configuration is obtained. In this configuration the brace cylinders 40 operate to insure that the extension of the piston from the bed cylinders lifts the trailer off the ground at the proper angle to prevent the collapse of the trailer due to the movement of the bed cylinder on the trunnion mount. When the bed cylinder has been extended by an amount sufficient to raise the pintle 27 above the fifth wheel device on a truck cab, a truck is positioned therebeneath. The trailer is then lowered until the fifty wheel assembly supports the trailer.

While I have shown and described embodiments of this invention in some detail, it will be understood that this description and illustrations are offered merely by way of example, and that the invention is to be limited in scope only by the appended claims.

I claim:

1. A folding gooseneck trailer comprising:
   a. a main bed supported on a plurality of wheels at one end;
   b. extensible lifting means for raising and lowering the other end of said main bed;
   c. a loading bed;
   d. pivotable links connecting said loading bed to said other end of said main bed to permit folding and unfolding of said loading bed relative to said main bed; and
   e. extensible means for pivoting links to fold and unfold said loading bed, said pivoting means being interconnected to said lifting means thereby to act as stationary bracing elements during operation of said lifting means.

2. The device of claim 1 further including means for preventing operation of said pivoting means while said lifting means is bearing the weight of said trailer to insure the pivoting means remain stationary when acting as a bracing element.

3. The device according to claim 2 wherein said means for preventing operation includes a check valve in the hydraulic system to prevent fluid flow to said pivoting means when the said lifting means is bearing the weight of the trailer.

4. The device of claim 1 further including means for preventing unfolding of said loading bed when said lifting means is bearing the weight of said trailer.

5. The device according to claim 4 wherein said means for preventing unfolding includes:
   a. a blocking pin for preventing movement of said pivotable links in a first position;
   b. air lock means for moving said blocking pin from said first position to permit movement of said links; and
   c. check means for rendering said air lock means inoperative when said lifting means is bearing the weight of said trailer.

6. The device according to claim 5 wherein said air lock means includes an air cylinder pivoting a lever arm to which the blocking pin is connected and said check means is a check valve.

7. The device of claim 1 wherein said lifting means includes:
   a. a pair of double acting hydraulic bed cylinders and pistons mounted to ones of said links;
   b. means for selectively operating said bed cylinders; and
   c. ground pads connected to the pistons of said cylinders by a connecting rod whereby operation of said cylinders causes extension and retraction of said ground pads to raise and lower said other end of said main bed.

8. The device according to claim 7 wherein said bed cylinders are pivotably mounted to said links near their piston end.

9. The device of claim 1 wherein said pivotable links include a pair of compression links and a pair of tension links and said lifting means are mounted on said compression links.

10. The device of claim 1 wherein the means for pivoting includes:
   a. a pair of hydraulic brace cylinders and pistons mounted to said other end of the main bed;
   b. hook plates attached to said loading bed and adapted to rotate said loading bed between the folded and unfolded positions in response to the extension and retraction of said brace cylinder pistons.

11. The device according to claim 10 wherein said brace cylinders are single acting and said retraction is caused by the weight of said loading bed during unfolding.

12. The device of claim 1 wherein:
a. said lifting means includes:
  i. a pair of double acting hydraulic bed cylinders and pistons mounted to ones of said links;
  ii. means for selectively operating said bed cylinders; and
  iii. ground pads connected to the pistons of said cylinders by a connecting rod whereby operation of said cylinders causes extension and retraction of said ground pads to raise and lower said other end of said main bed; and
b. said means for pivoting includes:
  i. a pair of hydraulic brace cylinders and pistons mounted to said other end of the main bed; and
  ii. hook plates attached to said loading bed and adapted to rotate said loading bed between the folded and unfolded positions in response to the extension and retraction of said brace cylinder pistons said brace pistons also connected to said ground pads and rendered inoperative during operation of said bed cylinders thereby to function as said bracing element.

13. The device of claim 1 further including means for preventing accidental operation of said pivoting means while said lifting means is bearing the weight of said trailer to insure the pivoting means remains stationary when acting as a bracing element and means for preventing unfolding of said loading bed when said lifting means is bearing the weight of said trailer.

14. A folding gooseneck trailer comprising:
a. a main bed supported on a plurality of wheels at one end;
b. a loading bed;
c. pivotable links connecting said loading bed to said other end of said main bed to permit folding and unfolding of said loading bed relative to said main bed;
d. extensible lifting means for raising and lowering the other end of said main bed including a pair of double acting hydraulic bed cylinders and pistons mounted to ones of said links, means for selectively operating said bed cylinders, and ground pads connected to the pistons of said bed cylinders by a connecting rod whereby operation of said bed cylinders causes extension and retraction of said ground pads to raise and lower said other end of said main bed;
e. extensible means for pivoting said links to fold and unfold said loading bed, said pivoting means being interconnected to said lifting means thereby to act as stationary bracing elements during operation of said lifting means, said pivoting means including a pair of hydraulic brace cylinders and pistons mounted to said other end of the main bed and hook plates attached to said loading bed and adapted to rotate said loading bed between the folded and unfolded positions in response to the extension and retraction of said brace cylinder pistons;
f. means for preventing operation of said pivoting means while said lifting means is bearing the weight of said trailer to insure the pivoting means remain stationary when acting as a bracing element; and
g. means for preventing unfolding of said loading bed when said lifting means is bearing the weight of said trailer.

* * * * *